United States Patent
Lee et al.

(10) Patent No.: US 10,037,195 B2
(45) Date of Patent: Jul. 31, 2018

(54) METHOD, MOBILE DEVICE AND SYSTEM FOR CREATING NEW MOBILE APPLICATION BY FUSING EXISTING PROGRAM STACKS

(71) Applicants: Pai-Tsung Lee, New Taipei (TW); Kuo-Cheng Parng, Taipei (TW)

(72) Inventors: Pai-Tsung Lee, New Taipei (TW); Kuo-Cheng Parng, Taipei (TW)

(*) Notice: Subject to any disclaimer, the term of this patent is extended or adjusted under 35 U.S.C. 154(b) by 14 days.

(21) Appl. No.: 15/212,548

(22) Filed: Jul. 18, 2016

(65) Prior Publication Data
US 2017/0277519 A1 Sep. 28, 2017

(30) Foreign Application Priority Data
Mar. 23, 2016 (TW) ............... 105108927 A

(51) Int. Cl.
| | |
|---|---|
| G06F 9/44 | (2018.01) |
| G06F 8/34 | (2018.01) |
| H04W 4/00 | (2018.01) |
| H04M 1/725 | (2006.01) |
| G06F 8/61 | (2018.01) |
| G06F 8/41 | (2018.01) |
| H04W 4/50 | (2018.01) |

(52) U.S. Cl.
CPC ............. *G06F 8/34* (2013.01); *G06F 8/41* (2013.01); *G06F 8/61* (2013.01); *H04M 1/72525* (2013.01); *H04W 4/001* (2013.01); *H04W 4/50* (2018.02)

(58) Field of Classification Search
CPC .............. G06F 8/34; G06F 8/30; G06F 9/443
USPC .......................................... 717/109
See application file for complete search history.

(56) References Cited

U.S. PATENT DOCUMENTS

| | | | |
|---|---|---|---|
| 6,446,057 B1* | 9/2002 | Vaughan | G06N 5/003 706/46 |
| 7,739,484 B2* | 6/2010 | Kissell | G06F 8/441 712/228 |
| 2012/0167052 A1* | 6/2012 | Fjeldstad | G06F 11/3664 717/125 |
| 2016/0321159 A1* | 11/2016 | Romm | G06F 11/364 |

* cited by examiner

*Primary Examiner* — John Chavis
(74) *Attorney, Agent, or Firm* — Che-Yang Chen; Law Offices of Scott Warmuth

(57) ABSTRACT

A method, mobile device and system for creating new mobile applications by fusing existing program stacks are disclosed. The system includes a number of mobile devices and a remote server. By using a modification program installed in the mobile device, the stacks can be restored to source codes, objects and user interfaces. Drag-and-drop editing and moderate modification on the source codes can be processed, further simplifying steps for creating new mobile applications. It not only benefits learners to study programming at younger ages, but also enables the creation of an on-line store which allows innovative stacks to be shared or sold thereby.

13 Claims, 6 Drawing Sheets

METHOD, MOBILE DEVICE AND SYSTEM FOR CREATING NEW MOBILE APPLICATION BY FUSING EXISTING PROGRAM STACKS

FIELD OF THE INVENTION

The present invention relates to a method, a mobile device and a system for creating new mobile applications. More particularly, the present invention relates to a mobile device and a system for creating new mobile applications by fusing existing program stacks.

BACKGROUND OF THE INVENTION

Generally, when a software engineer develops an application, it is rare to start from nothing at all. Based on the existing similar projects or the codes and modules provided from the Internet or textbooks, the software engineer can quickly utilize current resources, further modifying the resources to a certain degree to finish development. Similarly, if it is necessary to use interfaces during programming, the assistant art editor can design proper interfaces for the application referring to appropriate cases in the past. Some integrated development environments can provide templates for different applications to the developers. There are lots of useful codes and interface designs with no copyright issues. It makes development of applications more convenient.

Said integrated development environments are suitable for seasoned software engineers, as well as learners who have a certain level of understanding about programming. The differences between the two are size of the projects and the chosen template for initiation. However, under lawful situations and considering protection of copyright and business benefits, existing applications in operation can not be restored back to original source codes by the integrated development environments. For the users who have requirements about improvement of some specific application, he has to ask for the original developer's help or develop what he wants by himself or someone else. No matter it is the engineer or the learner, due to such reality, in order to develop another application with certain level, efforts and extra time are necessary costs. Since the procedure of coding is not short but depressed, many developers and students who just step into the field may feel boring about the operating environment gradually. Passion for programming reduces. Now, this issue can not have a solution to relieve. Instead, with the development of different hardware and change of business models, development of applications becomes more complicated.

Development of applications meets challenges. However, for the booming of IOT (Internet Of Things) and the coming era of made-by-robots, people face the challenges with a positive point of view. Programming education has been extended down to students at younger ages. It is expected that children can be trained to be interested in programming when they are in the elementary school, even using programming languages well to create some preferred applications. The goal is to build up basic ability for future challenges. However, as the current status of development of applications stated earlier, existing environment will soon obliterate the children's interest in programming. Thus, the programming educational courses nowadays still focus on graphical interface software, such as scratch. It is pity that this kind of learning material is not able to provide practical programming skills. It can only be used to find out the students who are interested in programming, not to popularize programming education.

Now, the main target of development of application is mobile application. As the popularization grown by smartphones and tablets, mobile applications have much room in these electronic products. From simple transmission and display of data to interesting game products, further to complex mobile payment system, advantages of the mobile applications are fully revealed. Most special of all, with the IOT facilities come out in large number, using mobile device with mobile application to control the electronic products around us has been a new life aspect. Although it is not easy to develop mobile applications, people are still looking for various ways to simplify programming for the great potential of the products in the future. Hence, learners' age can be younger. Therefore, an innovative method, device and system to create mobile applications are desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to settle the issues mentioned above, a method for creating new mobile applications by fusing existing program stacks is disclosed. The method comprises steps of: A. providing a plurality of program stacks each having a specific content B. restoring the program stacks to original codes, objects and user interfaces, respectively, which are editable at the same time; C. choosing at least one restored user interface to be active; D. editing and linking the codes, objects and user interfaces so that all or partial executable functions, or newly edited functions of the original program stacks are able to be expressed by the active user interface(s) after compiling; and E. compiling the codes, objects and active user interface(s) after editing and linking into a mobile application. The method may be applied on a mobile device, and step B to step E are executed by a visual integrated development environment.

Another aspect of the present invention is to provide a mobile device for creating new mobile applications by fusing existing program stacks. The mobile device has at least a memory unit, a touch screen and a wireless signal transceiving unit. It installs a modification program and stores a number of program stacks in the memory unit, each program stack having a specific content. It is characterized in that: when the modification program runs on the mobile device, a visual integrated development environment shows on the touch screen for operating edits at the same time, restoring the program stacks to original codes, objects and user interfaces, respectively, which are editable at the same time, choosing at least one restored user interface to be active by users, editing and linking the codes, objects and user interfaces so that all or partial executable functions, or new edited functions of the original program stacks are able to be expressed by the active user interface(s) after compiling; and compiling the codes, objects and active user interface(s) after editing and linking into a mobile application.

According to the spirit of the present invention, the mobile application may be used to control operation of the mobile device, control operation of an external hardware via the mobile device, or coordinately operate with the same mobile application installed on other mobile devices. Preferably, the mobile device may be a tablet or a smartphone. The wireless signal transceiving unit may be a Wi-Fi module, a Bluetooth module or an infrared module. In order to facilitate programming, only partial codes, objects or user interfaces of the program stack are allowed to be edited while others are not allowed to be edited.

Another aspect of the present invention is a system for creating new mobile applications by fusing existing program stacks. The system includes: a number of mobile devices according to claim 3; and a remote server, connected to the mobile devices through a network, for storing a plurality of program stacks, downloading a program stack which is not in any one of the mobile devices to a memory unit of said mobile device, and downloading the modification program to an external mobile device which is not installed the modification program so that the external mobile device becomes a new mobile device in the system after installing the modification program.

Preferably, any two mobile devices are able to be connected directly with respective wireless signal transceiving units, or be connected indirectly with respective wireless signal transceiving units via a network. The network is Ethernet or a mobile network. The remote server further compiles the program stacks into mobile applications for different systems and platforms for downloading. The connected mobile devices form a cluster, wherein at least one mobile device is set by the modification program installed therein to be server-mode, for downloading program stacks of a specific mobile application that is not in other non-server-mode mobile devices to the memory units of said non-server-mode mobile devices, or allowing the mobile application which has been installed in other non-server-mode mobile devices to operate functions of partial hardware of the server-mode mobile device. The modification program is able to switch the status of the mobile device between a client-mode and the server-mode.

The present invention utilizes source codes, objects and user interfaces restored from program stacks to process drag-and-drop edit and slight modification of codes. It simplifies steps for creating new mobile applications. In addition to facilitating programming learners to start learning from younger age, the present invention can also be used to form an on-line store, selling or sharing innovative program stacks.

DETAILED DESCRIPTION OF THE PREFERRED EMBODIMENTS

The present invention will now be described more specifically with reference to the following embodiments.

Figure 1:
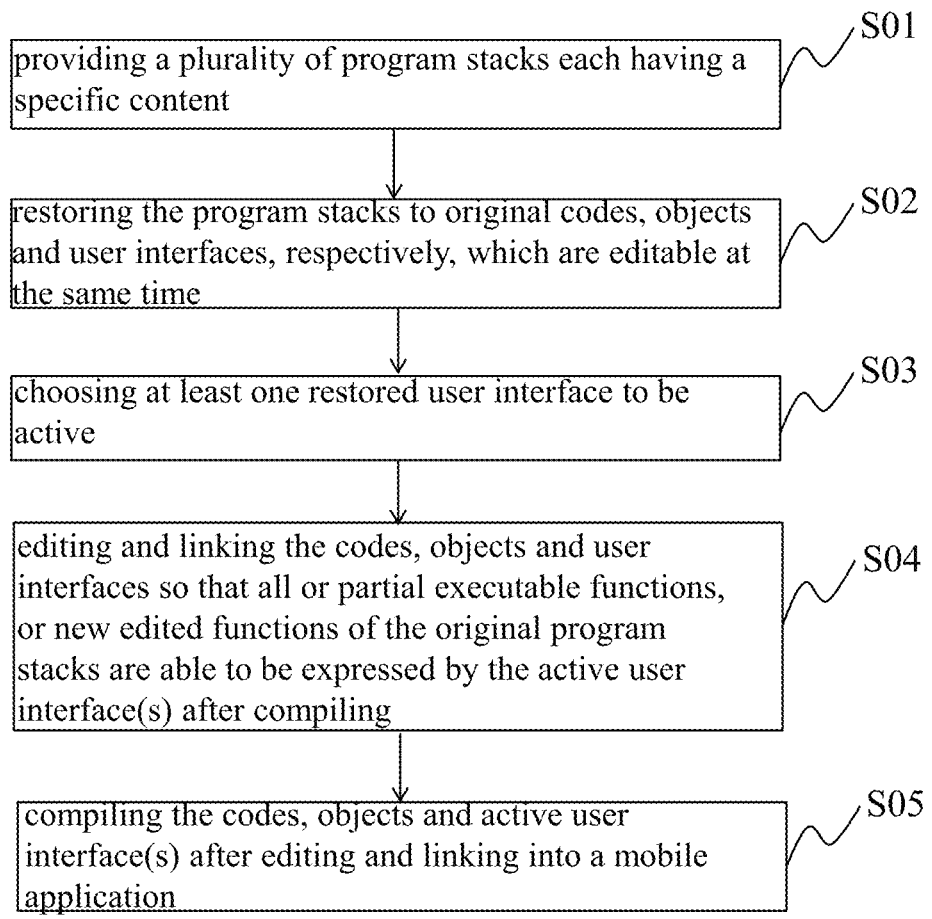
FIG. 1 is a flow chart of a method for creating new mobile applications by fusing existing program stacks according to the present invention.
Figure 2:
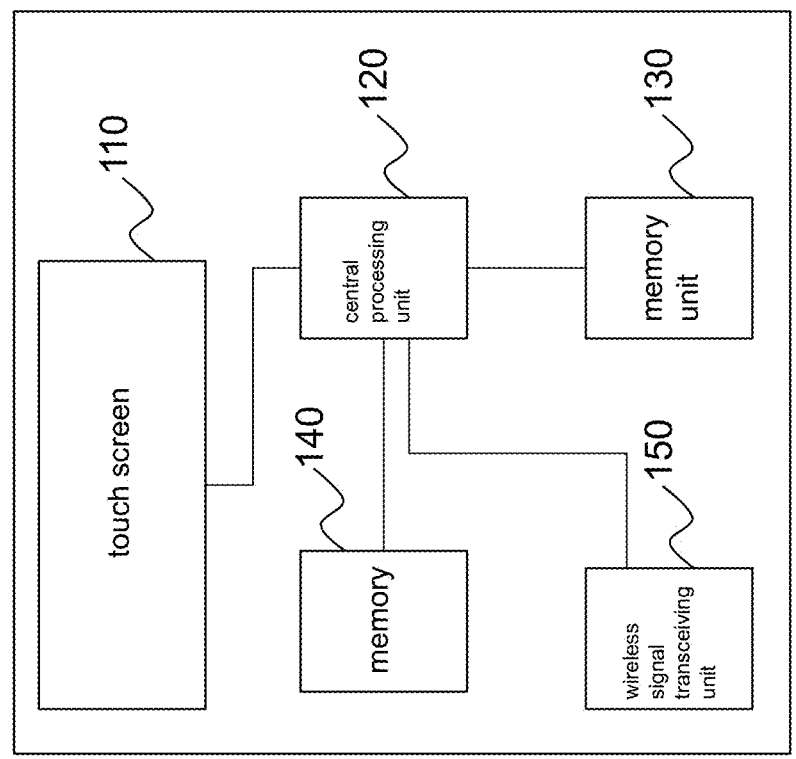
FIG. 2 shows a basic architecture of a mobile device for creating new mobile applications by fusing existing program stacks according to the present invention.

Please refer to FIG. 1. FIG. 1 is a flow chart of a method for creating new mobile applications by fusing existing program stacks provided by the present invention. The method is implemented upon a mobile device. The mobile device conforming to the requirement of the method should at least have devices (or equivalents) of hardware architecture: a touch screen 110, a central processing unit 120, a memory unit 130, a memory 140 and a wireless signal transceiving unit 150 (please refer to FIG. 2). The touch screen 110 provides messages to the users and allows users to input necessary instructions or information to interact with the mobile device. The memory unit 130 refers to a device conventionally used in storing data for a long time, such as hard discs, solid state discs, flash memory . . . etc. All program stacks and the mobile application which will be described later, when being distributed to the mobile device, are stored here first. With respect to the memory unit 130, the memory 140 is so-called random access memory. When the program stacks are edited or linked and the mobile application executes, all related data are stored here, waiting for the central processing unit 120 for further processing. The wireless signal transceiving unit 150 is the hardware of mobile device used to interact with other mobile devices, and transceiving data and files. For different transmission specifications, the wireless signal transceiving unit 150 may be a Wi-Fi module, a Bluetooth module or an infrared module. The central processing unit 120 is used to link the devices mentioned above and control these devices to function well. The mobile device may be a specific hardware for fulfilling the requirements from the related software used by the present invention. In practice, the mobile device may be a tablet or a smartphone available in the market.

In order to achieve the goal of the present invention, the mobile device needs to install a modification program and store several program stacks each having a specific content in the memory unit 130. The first step of the present invention is to provide a number of program stacks each having a specific content (S01). The program stacks refer to the files which can be an independent executable after compiling and can execute in specific operating system and platform. However, before compiling, the program stacks includes logic (codes), objects and user interfaces of the executable. Take an object oriented programming language, LIVECODE, as an example. The program stack is "stack" in LIVECODE. It can be edited and modified by the integrated development environment of LIVECODE. The way the program stack is provided may be that the user of the mobile device creates the program stack in the mobile device with the modification program, or a mobile device having that program stack distributes said program stack to another mobile device which doesn't have that program stack. A more convenient way is that the program stack can be stored in a remote server and downloaded to the mobile device which sends a request for it. The role of the modification program is not only to provide the integrated development environment with functions of edit and linkage, but is a bridge for passing information for two mobile devices when the two mobile devices both have the mobile applications and the mobile applications runs at the same time. Detailed operation will be illustrated in another embodiment.

According to the method provided by the present invention, the next step is to restore the program stacks to original codes, objects and user interfaces, respectively. The codes, objects and user interfaces are editable at the same time (S02). For every mobile device, this step is carried out by executing the modification program to present a visual integrated development environment (Please note that until the last step of the present invention, the visual integrated development environment is the interface to control the step in process). On the touch screen 110 of the mobile device, the modification program is shown as an icon. After the icon is tapped, contents of codes, objects, graphical interfaces and other necessary resources, such as scripting, libraries . . . etc., are temporarily stored to the memory 140. The central processing unit 120 is operated to control the mobile device. After executing, the modification program chooses the program stacks stored in the memory unit 130 to edit according to the user's request. Every program stack for editing is loaded to the integrated development environment. They are restored to respective codes, objects and user interfaces for user to edit.

Figure 4:
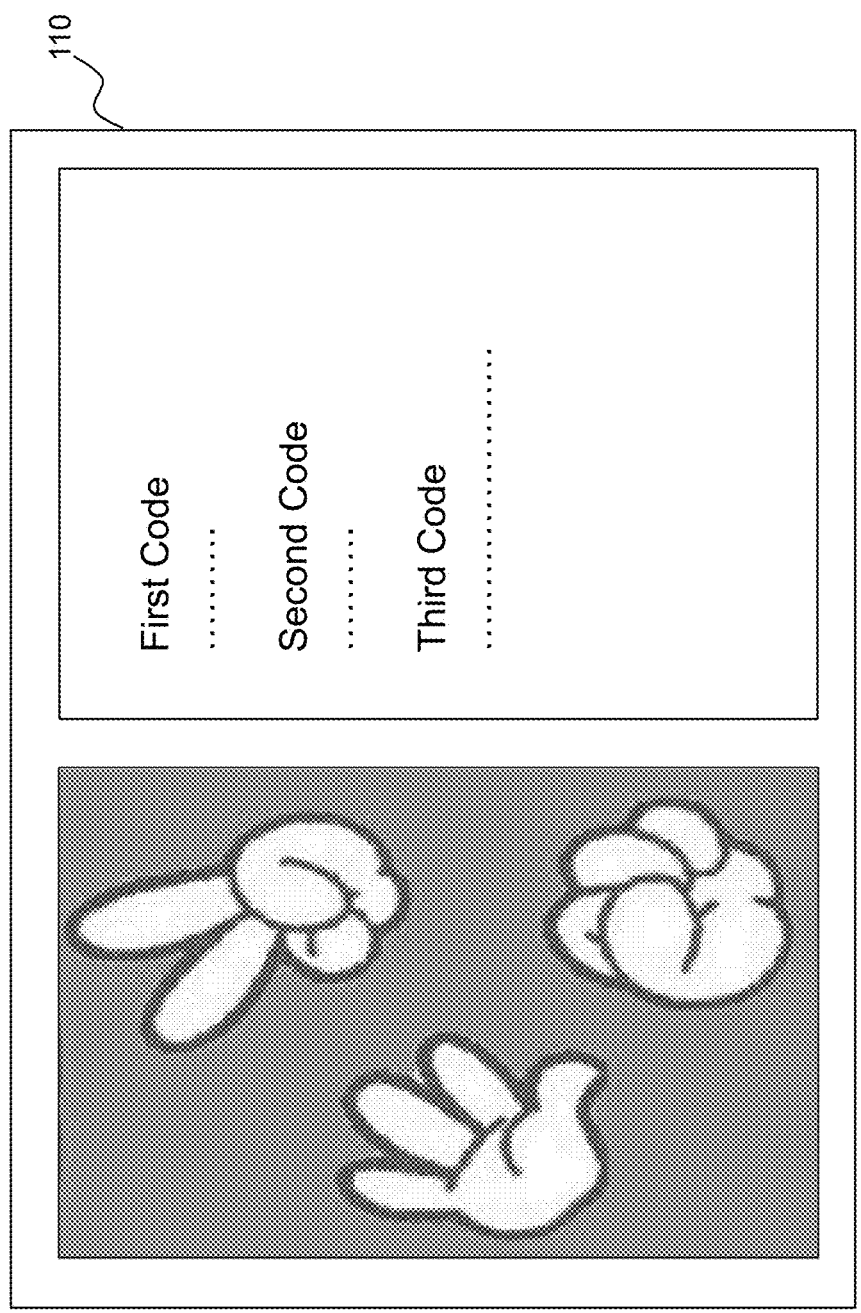
FIG. 4 to FIG. 6 show an integrated development environment on a touch screen.
Figure 5:
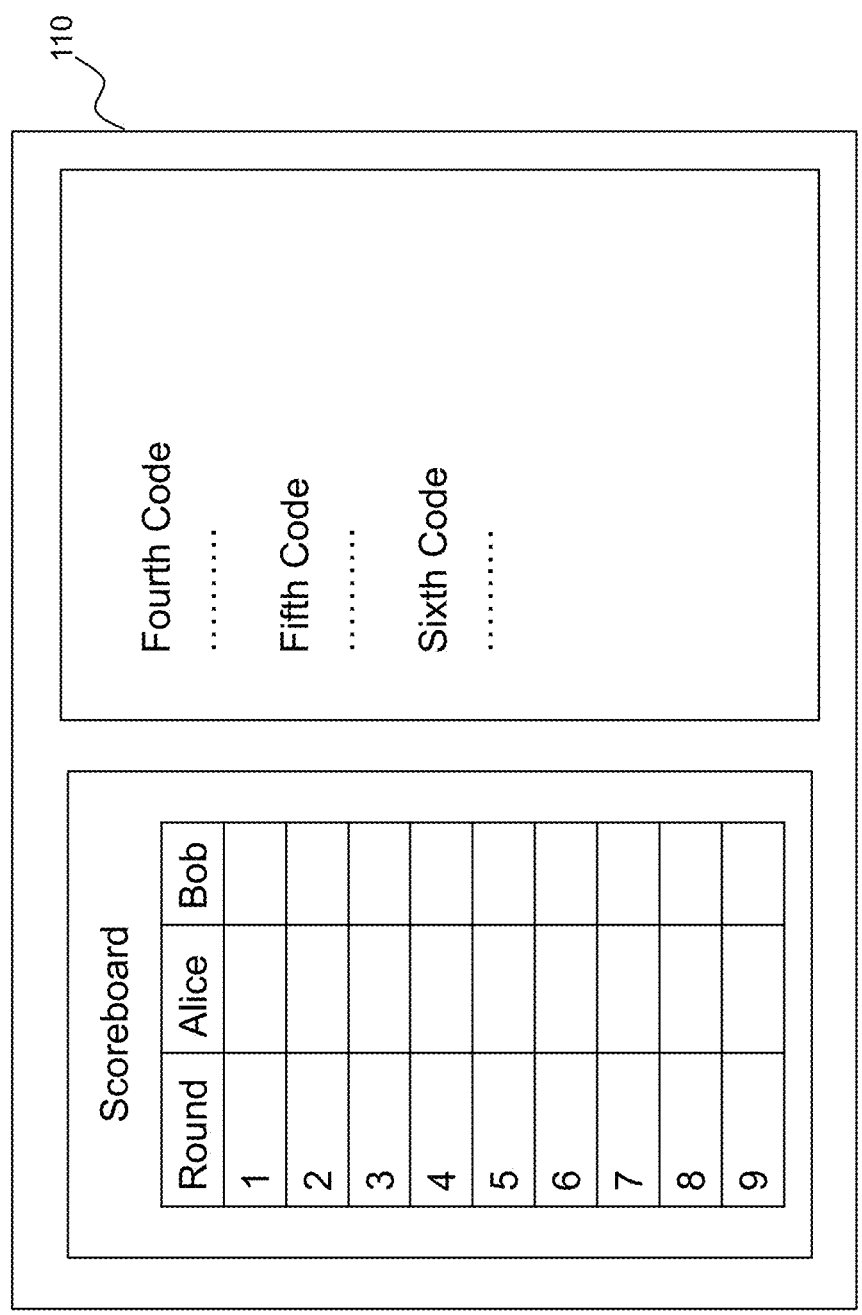
Figure 6:
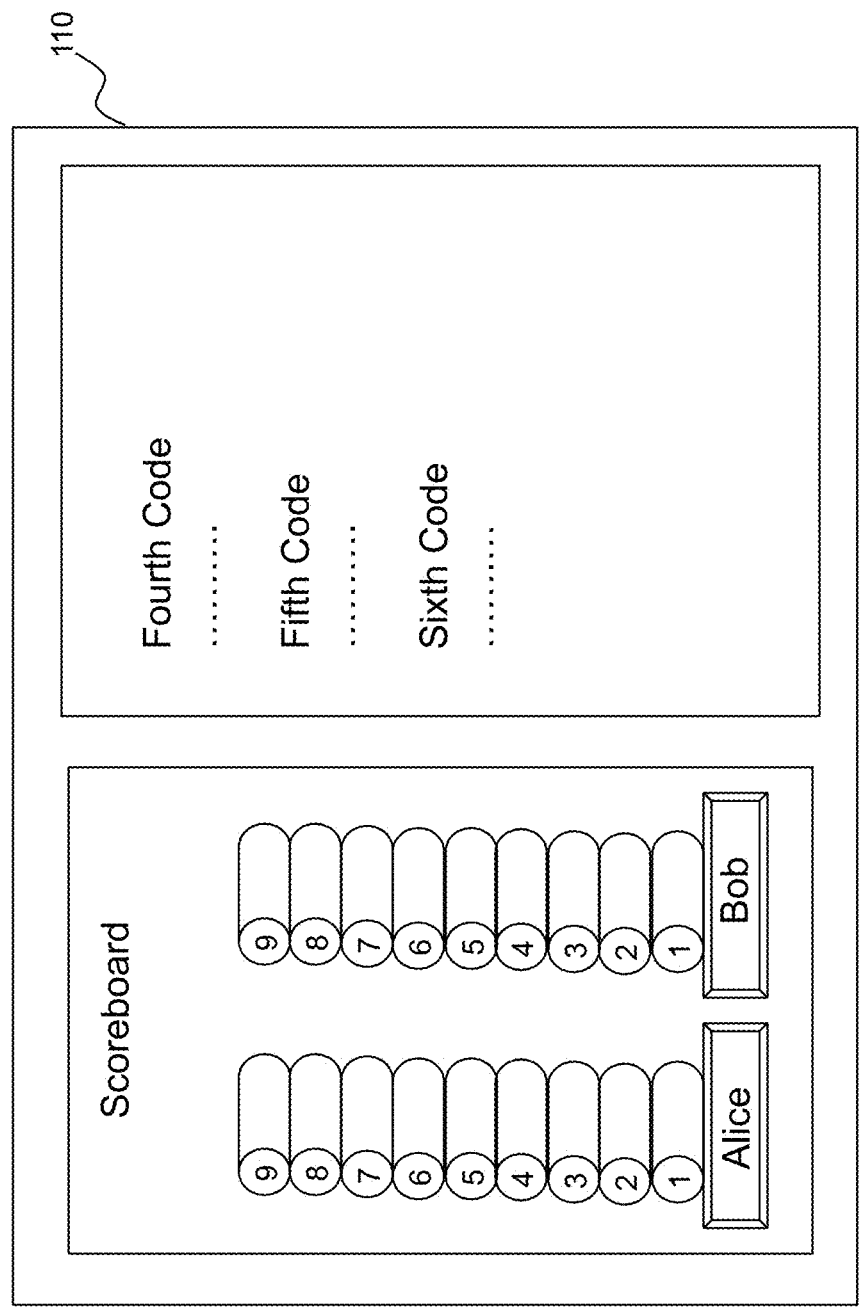

An example for editing the codes is shown in FIG. 4 to FIG. 6. The modification program picks up a first program stack which can perform rock-paper-scissors game after compiling. In the integrated development environment shown on the touch screen 110, a first user interface and objects (on the left), and all codes (on the right) of the first program stack show up at the same time. A first code executes background and display (first user interface), a second code controls a display method of the objects of rock, paper and scissors. A third code judges who wins in a round or the number of wins (scores) for the two sides in a game. When the background on the left is tapped, the first code on the right becomes an editable status; when an alphabet or numeric in the first code is tapped, the background is highlighted with a special color to facilitate users to edit the code. The same correspondence exists between the second code and the three objects. Since there are three objects, when each object is tapped, only related code is highlighted to facilitate modification of the objects or change the objects. Because the third code doesn't have the corresponding user interface object, it can't be edited directly. Meanwhile, users can choose a second program stack which can execute a scoreboard game after compiling via the modification program. As shown in FIG. 5 and FIG. 6, the second program stack has two user interfaces. A fourth code controls operation of a second user interface and the objects thereon (on the left of FIG. 5). A fifth code controls operation of a third user interface and the objects thereon (on the left of FIG. 6). A sixth code deals with competitor data and scores in each round. If the second program stack is edited and the second user interface is tapped, the fourth code is in an editable status; on the contrary, if an alphabet or numeric in the fourth code is tapped, the second user interface is highlighted with a special color. The relationship between the fifth code and the third user interface is the same as that between the fourth code and the second user interface. The sixth code is a logic control. Therefore, it can be edited alone. It should be noticed that the second user interface and the third user interface can be switched when the second program stack is under edit. If the user interface needs to be changed, an order can be sent to the modification program, for example, by sliding the finger from top to bottom across the touch screen 110.

The second program stack and the first program stack are edited under the control of the modification program at the same time. Only the code, object or user interface of the program stack which is in editing shows up in the integrated development environment. If a program stack in editing needs to be changed, an order can be sent to the modification program, for example, by sliding the finger from left to right across the touch screen 110. What mentioned above is only an aspect of the integrated development environment in the present invention. The code and the user interface can be shown separately when editing. Namely, the integrated development environment only shows one of them. Another way may be to show the user interface and the objects thereon. When the user interface or object is chosen, related code shows up close to the user interface or the object for editing. In addition, regarding the attributes of the user interface or the object, they can be further edited or changed when the user interface or the object is chosen. For example, a graphic object is framed externally. The detailed modification is done by the modification program disclosed by the present invention. The form of the editing interface is not limited by the present invention.

At this stage, an important step is to choose at least one restored user interface to be active (S03). Use the example mentioned above for illustration. An essential role of the present invention is to restore more than two program stacks to respective codes, objects and user interfaces by the modification program and edit the codes, objects and user interfaces. The modification program designed by the present invention has some features different from other conventional integrated development environments. First, the modification program is only applied to the mobile device without a physical keyboard to create new program stacks, fuse existing program stacks to new program stacks, and compile program stacks to be executable mobile applications. The conventional integrated development environments are used in the personal computers which need input devices such as keyboard and mouse. Since the touch screen 110 of the mobile device is not convenient to edit codes in a wide range, the way the mobile application edits the program stacks is mainly by dragging and tapping objects to call corresponding codes for slight modification (edit). Second, conventionally, software engineers use the integrated development environment to create a main project and copy referenced codes from other projects to the main project to edit them. However, when the modification program executes, its operating logic puts all the restored contents from the program stacks into a new program stack at the same time. The modification program keeps the variables and logic relationships in corresponding codes for all user interfaces and related objects. Users need to edit codes to increase or reduce the functions defined by the original program stacks. More importantly, they need to re-define operating logics, objects and interacting relationships among the original program stacks. Namely, a result of operation from a code of a program stack can be used or presented by an object of a user interface in another program stack. Third, users have to choose at least one user interface to be active. This is what conventional integrated development environments never do. About the second and the third point, use the first program stack and the second program stack mentioned above for illustration.

The rock-paper-scissors game designed in the first program stack can be installed in two mobile devices after it is compiled. After these two mobile devices are linked by respective wireless signal transceiving units 150, two sets of mobile applications of rock-paper-scissors game are on-line. Players can shake the mobile device holding in his hand. Two mobile applications of rock-paper-scissors game run in the mobile devices will randomly send a message of a rock, a paper or a scissors to each other. Winner is recognized after comparison. The touch screen 110 of each mobile device shows images about the sent messages from both sides. The scoreboard game in the second program stack is to input scores in each round for two competitors (regardless of events) in a single mobile device and store the related data in a connected data file. Now, a job is to design a new mobile application of on-line rock-paper-scissors game without showing the images. Instead, a scoreboard with scores in each round (1 for win, 0 for lose, two 0 s for both sides for deuce) is presented on two touch screen 110. Operation of the modification program is to restore the first program stack and the second program stack to get respective codes, objects and user interfaces. Users can edit and link the restored codes, modified codes, objects and user interfaces, and/or add new codes through the touch screen 110 at the same time. For example, the result from the third code is not sent to the second code but the sixth code as an input for a single round. Originally, the output of the sixth code is optionally sent to the fourth code or the fifth code as a display for corresponding user interface. Now, to be concise, only the fifth code is defined to receive the output of the sixth code. Namely, only the third user interface shows in the mobile application compiled from the fused program stack (fused from the two program stacks). The third user interface is "active". Of course, in addition to the indirect definition from operating logic linkage, the modification program should be notified that the third user interface is chosen to be active. There are many ways of notification, e.g. long-press on the user interface for 5 seconds. Mistakenly chosen user interface can be cancelled. There are also many ways to achieve so, for example, long-press on the mistakenly chosen user interface for 5 seconds. The actions on the modification program are step S04 in FIG. 1: editing and linking the codes, objects and user interfaces so that all or partial executable functions, or new edited functions of the original program stacks are able to be expressed by the active user interface(s) after compiling.

A last step in the method for creating new mobile application provided by the present invention is compiling the codes, objects and active user interface(s) after editing and linking into a mobile application (S05). The modification program executes said step to generate a mobile application (Here, the mobile application can only be used in control operation of the mobile device. In order to differentiate from the mobile applications having other functions or features which will be described later, the mobile application here is called first mobile application) conforming to the new requirement after modification and used in the mobile device.

It should be noticed that, in practice, the modification program may also combine the codes, user interfaces and objects in the program stacks which are not used to pack into the new fused program stack. In addition to create new mobile applications, the modification program can keep the new fused program stack as it is (not to process compiling). Thus, the users own the new fused program stack can restore it again. With reference to the way someone else edited the new fused program stack, a newer program stack with desired functions can be obtained by modification or further edit.

Figure 3:
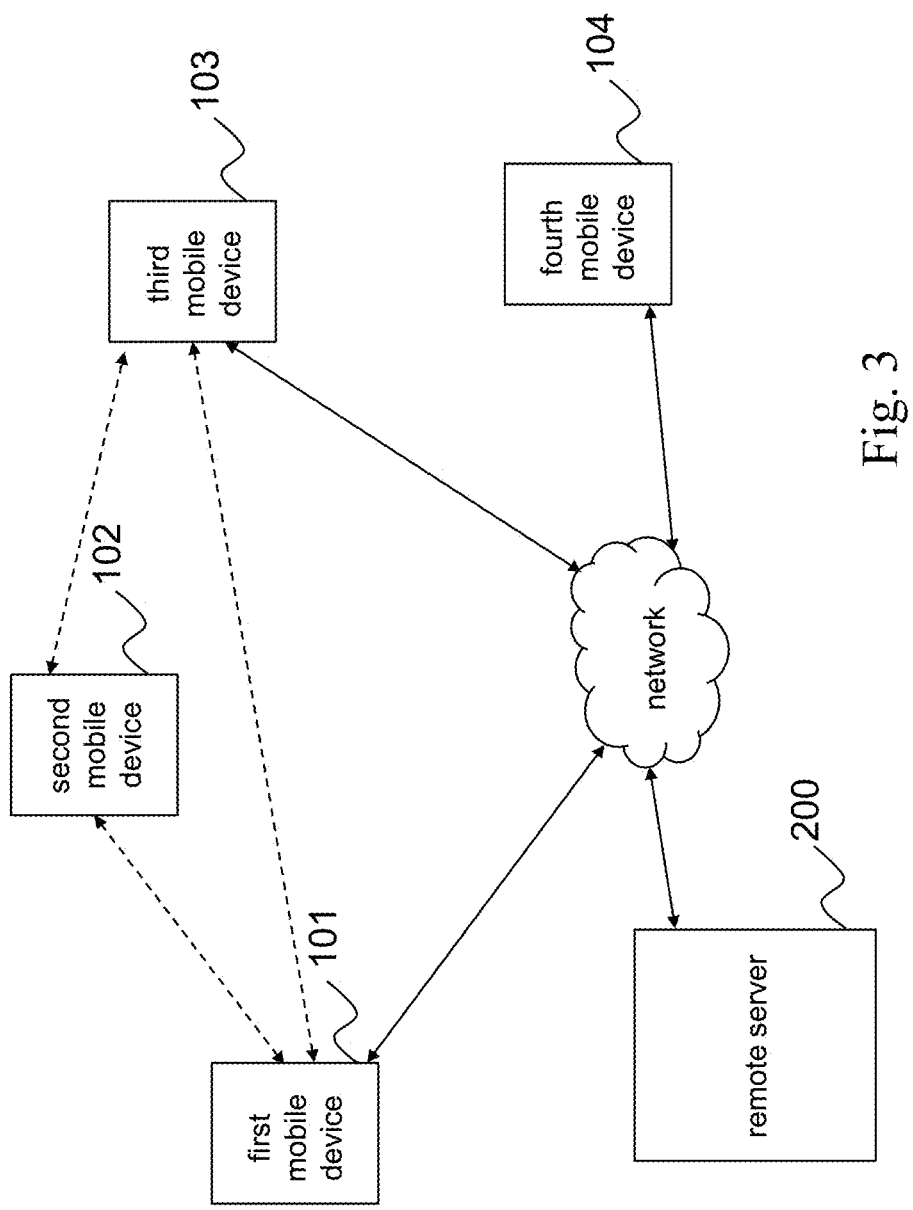
FIG. 3 shows a system for creating new mobile applications by fusing existing program stacks according to the present invention.

Another embodiment of the present invention is a system. The system applies the mobile device to fuse existing program stacks to create new mobile applications. The system is illustrated by FIG. 3. In the embodiment of FIG. 3, a system fusing existing program stacks to create new mobile application includes a remote server 200, a first mobile device 101, a second mobile device 102 and a third mobile device 103. It should be noticed that the number of mobile devices in the system is not limited to 3. It just takes the three mobile devices (a fourth mobile device 104 is not added in the system yet) in FIG. 2 for example. In fact, for the system, the number of mobile device should be at least one and no maximum limit.

The said four mobile devices are not required to be identical. Each of them may be a smartphone, a tablet or a specific hardware designed for the requirements above. Any two of the first mobile device 101, the second mobile device 102, and the third mobile device 103 can be connected directly with respective wireless signal transceiving units 150, or be connected indirectly with respective wireless signal transceiving units 150 via a network. The status shown in FIG. 3 is that any two of the first mobile device 101, the second mobile device 102 and the third mobile device 103 can be connected directly with respective wireless signal transceiving units 150. The first mobile device 101 and the third mobile device 103 can be connected indirectly via the network. The network may be Ethernet or a mobile network. For Ethernet, the mobile devices require bridging of wireless network base stations.

As mentioned above, another feature of the modification program is to distribute generated first mobile application to other connected mobile devices through the wireless signal transceiving unit 150 of the mobile device where edit processes. For example, if the first mobile application is generated from the second mobile device 102, it can be distributed to the first mobile device 101 and the third mobile device 103 under the linkage shown in FIG. 2 (shown by dashed arrows). The first mobile application can be installed or not depending on the user's will. Skills of distribution of mobile applications are commonly used by many software engineers. It is not limited by the present invention to use any one of them in designing the modification program.

It should be noticed that for some developers of the program stacks, they would not like some special functions in the program stacks be modified or just want the following users to only edit the adjustment of functions and linkages of codes. Only partial codes, objects or user interfaces of the program stack are allowed to be edited while the rest are not allowed to be edited. The common practice is to call the library of the program stack or directly remark in the code that where can be modified or not. It can also simplify editing processes.

The remote server 200 is an auxiliary equipment. The remote server 200 is connected to all or some of the mobile devices mentioned above through the network (In FIG. 3, it is connected to the first mobile device 101 and the third mobile device 103), for storing several program stacks, downloading a program stack which is not in any one of the mobile devices to the memory unit 130 of said mobile device, and downloading the modification program to an external mobile device which is not installed the modification program so that the external mobile device becomes a new mobile device in the system after installing the modification program. In FIG. 3, the fourth mobile device 104 is not a unit of the system at first. By linking to the remote server 200 via the network and downloading and installing the modification program, the fourth mobile device 104 is able to carry our edit, link and distribution on existing program stacks. Furthermore, the remote server 200 has a feature: it can compile the program stacks into mobile applications for different systems and platforms for downloading.

According to the description for the remote server 200, it is clear that setup of the remote server 200 can form an on-line store. This on-line store is different from that for generally downloading mobile applications. The latter only sells and downloads executable mobile applications. As to the remote server 200 provided by the present invention, it can download not only the executable mobile applications, but mainly the program stacks for the users of the mobile device to edit and link, further creating new applications. The product is paid or not depends on the idea of the original creator of the program stack. Due to the remote server 200, the whole system is suitable for programming education, especially for younger and novice learners. With simple dragging of objects and linkages of logics, users can quickly get the programming task started and use it to solve problems in daily life.

According to the spirit of the present invention, in another embodiment, after compiling, the mobile application can not only change its control methods, but manipulate an external hardware through the mobile device. The practice is when the program stack is under design, it includes codes for controlling the wireless signal transceiving unit 150 and connecting the mobile device and the external hardware by operating the API (Application Program Interface) provided by the external hardware. Therefore, after the program stack is compiled to a second mobile application (it is different from the first mobile application which can only run in mobile devices), the second mobile application is able to control the operation of the external hardware. For example, the external hardware may be a remote control aircraft. There are many mobile applications which can be installed in smartphones to control remote control aircrafts. Design rules are the same. The difference is that with the operation of the system disclosed by the present invention, users can edit and link program stacks of a second mobile application for controlling the remote control aircraft and of a first mobile application used only for outputting control instructions. New control method can be created. Interface can also be modified to replace the original control interface used in the second mobile application to control the remote control aircraft. In addition, like the first mobile applications which can connected to one another, the second mobile application can also coordinately operates the same second mobile applications installed in other mobile devices to control the external hardware. For example, a second mobile application for controlling an air conditioner has been installed all smartphones of members of a family. Thus, all members can control the air conditioner. From the example above, it is clear that the system disclosed by the present invention can let professionals in different fields to develop program stacks for what they are familiar with. Users can download the program stacks for further edit. For many hardware developers, it is advantageous: they only have to prepare program stacks of the second mobile applications which can control their products in the remote server 200 for downloading. Any control method or interface can be available by editing the restored program stacks of professional control interfaces at the same time. Procedure for modification is quite simple: only limited portion of codes is allowed for editing.

In still another embodiment, connected mobile devices can form a cluster (As the three mobile devices in FIG. 3). At least one mobile device is set by the modification program installed therein to be server-mode, for downloading program stacks of a specific mobile application that is not in other non-server-mode mobile devices to the memory units of said non-server-mode mobile devices, or allowing a third mobile application (the third mobile application presents the mobile application used in a server-mode mobile device) which has been installed in other non-server-mode mobile devices to operate functions of partial hardware of the server-mode mobile device. For example, for the rock-paper-scissors game in the previous embodiment, if one of the two players delays the action (shaking the mobile device) for a long time, the other mobile device receives no message. Thus, the game may be terminated. However, if the third mobile device 103 is used as a server-mode mobile device and re-develop the first mobile application for the rock-paper-scissors game to a third mobile application, the game between the first mobile device 101 and the second mobile device 102 (non-server mode) can be bridged by the third mobile device 103. If one side delays the action for a long time, the third mobile application for the rock-paper-scissors game in third mobile device 103 will wait. The game will not terminate. The only restriction is the server mode third mobile device 103 should be always on and connected with other non-server mode mobile devices. Functions of some hardware, e.g. the wireless signal transceiving unit 150 and the central processing unit 120 should be shared with other non-server mode mobile device to use. Of course, the role of the third mobile device 103 can be set to and executed by the remote server 200. The server mode mobile device is not unchangeable. The modification program is able to switch the status of the mobile device between a client-mode and the server-mode depending on what status the mobile device is. Namely, only the owner of the mobile device is willing, the system may include many server mode mobile devices. It should be noticed that the third mobile application, the second mobile application and the first mobile application only have difference in the level of application. The way they are generated from program stacks is the same.

According to the illustration above, the present invention has a special case: when there is only one mobile device, it can distribute complied mobile application to itself by the modification program. This condition happens when one mobile device has multiple operating systems or virtual machines. An inventor of a mobile application can distribute what he has created to another operating system or virtual machine in the same mobile device. Thus, he can test operation of the mobile application on different platforms, even connected operation across the platforms.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

The invention claimed is:

1. A method for creating new mobile applications by fusing existing program stacks, comprising steps of:
   A. providing a plurality of program stacks each having a specific content;
   B. restoring the program stacks to original codes, objects and user interfaces, respectively, which are editable at the same time;
   C. choosing at least one restored user interface to be active;
   D. editing and linking the codes, objects and user interfaces so that all or partial executable functions, or new edited functions of the original program stacks are able to be expressed by the active user interface(s) after compiling; and
   E. compiling the codes, objects and active user interface(s) after editing and linking into a mobile application.

2. The method according to claim 1, wherein the method is applied on a mobile device, and step B to step E are executed by a visual integrated development environment.

3. A mobile device for creating new mobile applications by fusing existing program stacks, having at least a memory unit, a touch screen and a wireless signal transceiving unit, being installed a modification program, and storing a plurality of program stacks in the memory unit, each program stack having a specific content, characterized in that: when the modification program runs on the mobile device, a visual integrated development environment shows on the touch screen for operating edits at the same time, restoring the program stacks to original codes, objects and user interfaces, respectively, which are editable at the same time, choosing at least one restored user interface to be active by users, editing and linking the codes, objects and user interfaces so that all or partial executable functions, or new edited functions of the original program stacks are able to be expressed by the active user interface(s) after compiling; and compiling the codes, objects and active user interface(s) after editing and linking into a mobile application.

4. The mobile device according to claim 3, wherein the mobile application is used to control operation of the mobile device, control operation of an external hardware via the mobile device, or coordinately operate with the same mobile application installed on other mobile devices.

5. The mobile device according to claim 3, wherein the mobile device is a tablet or a smartphone.

6. The mobile device according to claim 3, wherein the wireless signal transceiving unit is a Wi-Fi module, a Bluetooth module or an infrared module.

7. The mobile device according to claim 3, wherein only partial codes, objects or user interfaces of the program stack are allowed to be edited while the rest are not allowed to be edited.

8. A system for creating new mobile applications by fusing existing program stacks, comprising:
   a plurality of mobile devices according to claim 3; and
   a remote server, connected to the mobile devices through a network, for storing a plurality of program stacks, downloading a program stack which is not in any one of the mobile devices to a memory unit of said mobile device, and downloading the modification program to an external mobile device which is not installed the modification program so that the external mobile device becomes a new mobile device in the system after installing the modification program.

9. The system according to claim 8, wherein any two mobile devices are able to be connected directly with respective wireless signal transceiving units, or be connected indirectly with respective wireless signal transceiving units via a network.

10. The system according to claim 8, wherein the network is Ethernet or a mobile network.

11. The system according to claim 8, wherein the remote server further compiles the program stacks into mobile applications for different systems and platforms for downloading.

12. The system according to claim 8, wherein the connected mobile devices form a cluster, wherein at least one mobile device is set by the modification program installed therein to be server-mode, for downloading program stacks of a specific mobile application that is not in other non-server-mode mobile devices to the memory units of said non-server-mode mobile devices, or allowing the mobile application which has been installed in other non-server-mode mobile devices to operate functions of partial hardware of the server-mode mobile device.

13. The system according to claim 12, wherein the modification program is able to switch the status of the mobile device between a client-mode and the server-mode.

* * * * *